(12) United States Patent
Kramer, Jr. et al.

(10) Patent No.: US 7,942,445 B2
(45) Date of Patent: May 17, 2011

(54) PERSONAL MOBILITY VEHICLE WITH ANTI-TIP SUSPENSION

(75) Inventors: DuWayne E. Kramer, Jr., Lake Quivira, KS (US); Brian W. Mellies, Stilwell, KS (US)

(73) Assignee: Burke, Inc., Kansas City, KS (US)

( * ) Notice: Subject to any disclaimer, the term of this patent is extended or adjusted under 35 U.S.C. 154(b) by 114 days.

(21) Appl. No.: 12/505,696

(22) Filed: Jul. 20, 2009

(65) Prior Publication Data

US 2009/0302589 A1    Dec. 10, 2009

Related U.S. Application Data

(63) Continuation of application No. 11/455,564, filed on Jun. 19, 2006, now Pat. No. 7,562,903.

(51) Int. Cl.
*B60S 9/00* (2006.01)
(52) U.S. Cl. ......................... 280/755; 180/907
(58) Field of Classification Search .................. 280/755; 180/907
See application file for complete search history.

(56) References Cited

U.S. PATENT DOCUMENTS

| | | | |
|---|---|---|---|
| 5,036,938 A * | 8/1991 | Blount et al. | 180/208 |
| 5,435,404 A * | 7/1995 | Garin, III | 180/6.5 |
| 5,964,473 A | 10/1999 | Degonda et al. | |
| 6,041,876 A | 3/2000 | Pulver et al. | |
| 6,131,679 A | 10/2000 | Pulver et al. | |
| 6,135,222 A * | 10/2000 | Furukawa | 180/65.51 |
| 6,206,119 B1 * | 3/2001 | Wu | 180/65.1 |
| 6,439,331 B1 * | 8/2002 | Fan | 180/208 |
| 6,460,641 B1 * | 10/2002 | Kral | 180/24.02 |
| 6,530,446 B1 | 3/2003 | Lin | |
| 6,533,306 B2 | 3/2003 | Watkins | |
| 6,543,798 B2 | 4/2003 | Schaffner et al. | |
| 6,554,086 B1 | 4/2003 | Goertzen et al. | |
| 6,601,863 B1 | 8/2003 | Mentessi et al. | |
| 6,640,916 B2 | 11/2003 | Schaffner et al. | |
| 6,672,606 B1 * | 1/2004 | Dwyer et al. | 280/124.165 |

(Continued)

OTHER PUBLICATIONS

"Invacare Zoom Product Literature", www.invacare.com, Apr. 29, 2006.

(Continued)

*Primary Examiner* — Paul N Dickson
*Assistant Examiner* — Nicole Verley
(74) *Attorney, Agent, or Firm* — Law Office of Mark Brown, LLC; Mark E Brown

(57) ABSTRACT

A personal ability vehicle (PMV) includes a frame with front and rear subframes. A steering mechanism is mounted on the front subframe and includes a steering front wheel connected to a tiller. The rear subframe includes a suspension mount comprising a pair of rear support legs. An anti-tip suspension includes a pair of trailing arms each mounting a trailing wheel. Each trailing arm is pivotally mounted on a respective support leg whereby the suspension is inevitable through a limited range of motion about a transverse suspension pivotal axis. A pair of spring assemblies are attached to the trailing arms and are adapted for selectively engaging the support legs to provide a counter-rotational torque force around the suspension pivotal axis in order to resist backwards tipping of the PMV, for example, when it is ascending an inclined sloping surface. Relatively uniform proportional, weight distribution on said steering front, main and trailing wheels is maintained throughout a range of loads.

20 Claims, 12 Drawing Sheets

U.S. PATENT DOCUMENTS

| | | | |
|---|---|---|---|
| 6,712,369 B2 * | 3/2004 | Wu | 280/5.2 |
| 6,773,032 B2 * | 8/2004 | Redman et al. | 280/755 |
| 6,896,084 B2 | 5/2005 | Lo | |
| 6,923,280 B2 | 8/2005 | Goertzen et al. | |
| 6,926,106 B2 | 8/2005 | Richey et al. | |
| 6,938,923 B2 | 9/2005 | Mulhern et al. | |
| 7,104,346 B2 * | 9/2006 | Schaffner | 180/65.1 |
| 7,219,755 B2 | 5/2007 | Goertzen et al. | |
| 7,264,272 B2 | 9/2007 | Mulhern et al. | |
| 7,270,208 B2 * | 9/2007 | Huang | 180/68.5 |
| 7,273,118 B2 * | 9/2007 | Huang | 180/65.1 |
| 7,293,801 B2 | 11/2007 | Bertrand et al. | |
| 7,389,835 B2 * | 6/2008 | Mulhern et al. | 180/22 |
| 7,516,984 B2 | 4/2009 | Tang | |
| 2005/0206149 A1 * | 9/2005 | Mulhern et al. | 280/755 |
| 2007/0063499 A1 * | 3/2007 | Shem | 280/755 |
| 2007/0209848 A1 * | 9/2007 | Tang | 180/65.1 |

OTHER PUBLICATIONS

"Vehicles Technology, VCS-S5", www.vcvehicles.com, Apr. 29, 2006.

"Invacare Product Catalog", *Invacare 400 Cady Red 18" Seat*, www.invacare.com, Apr. 29, 2006.

* cited by examiner

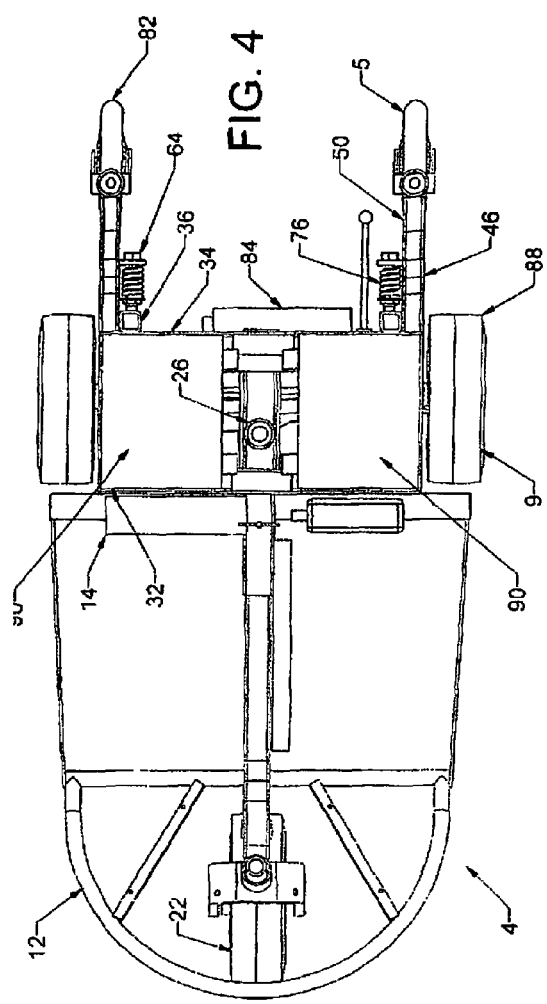
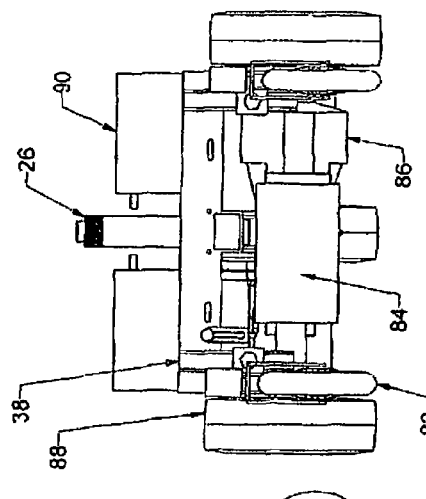
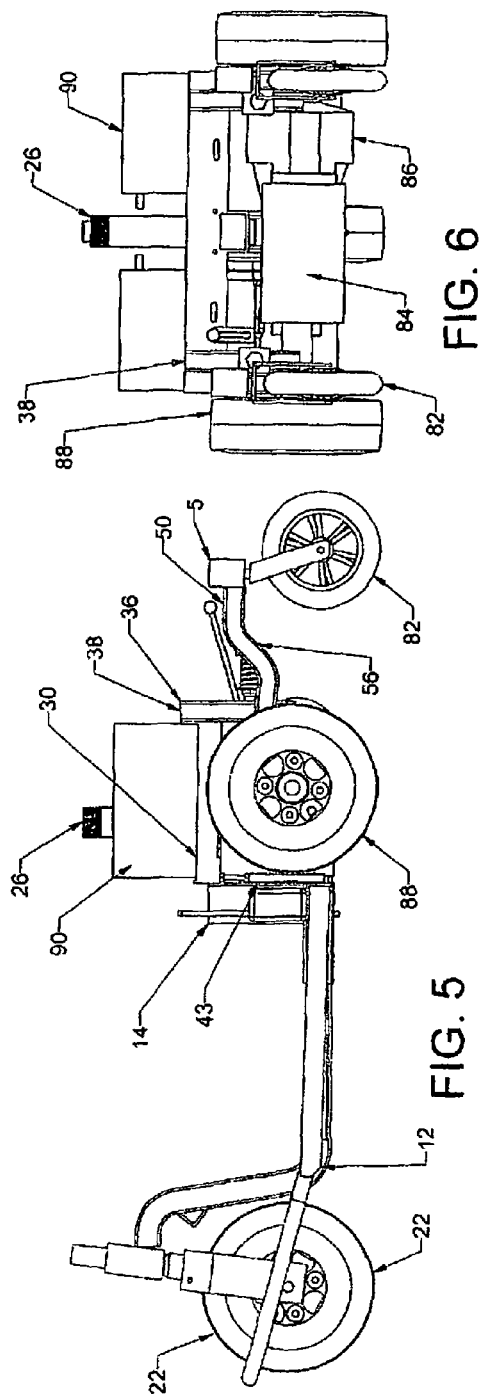

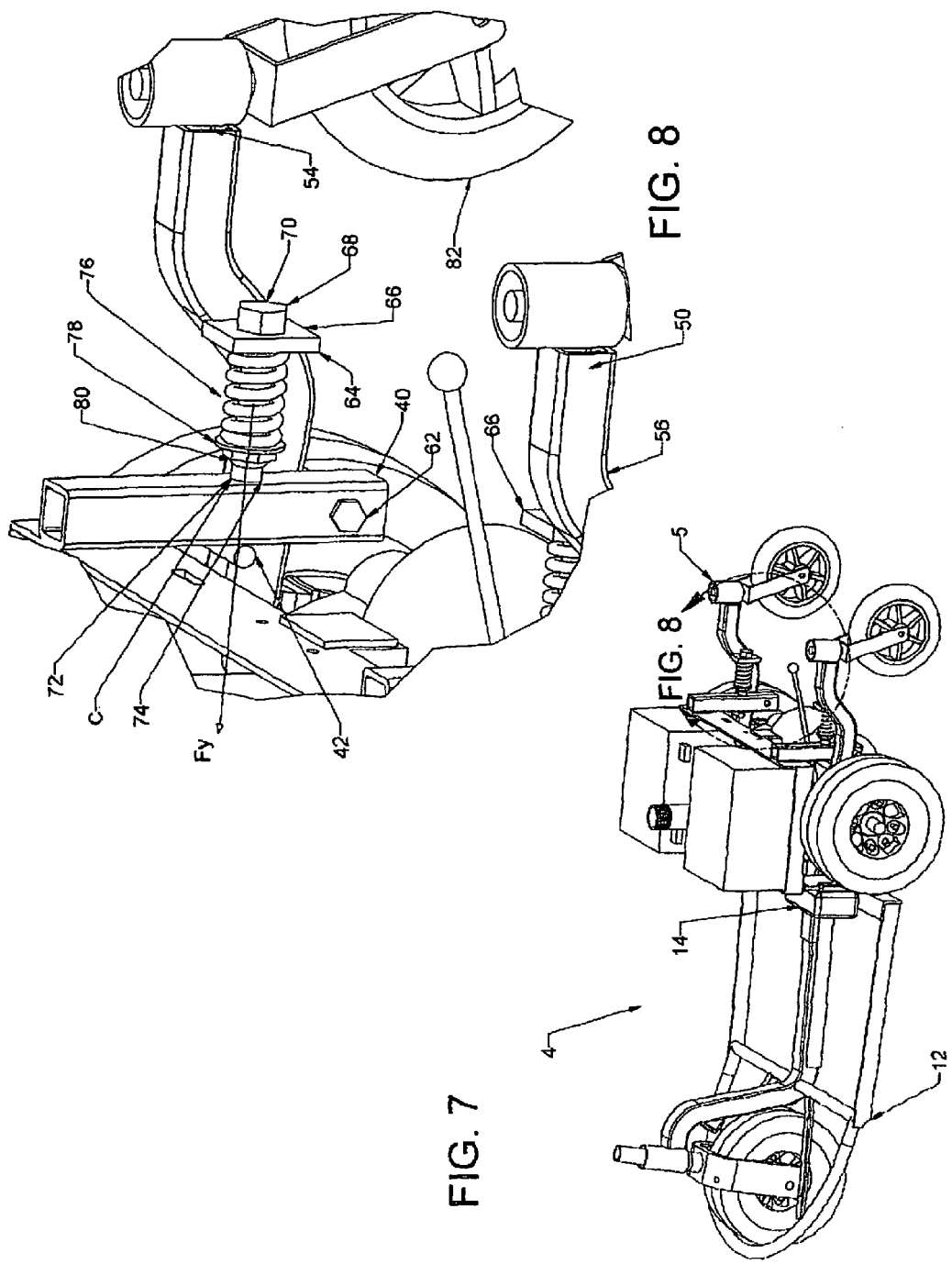

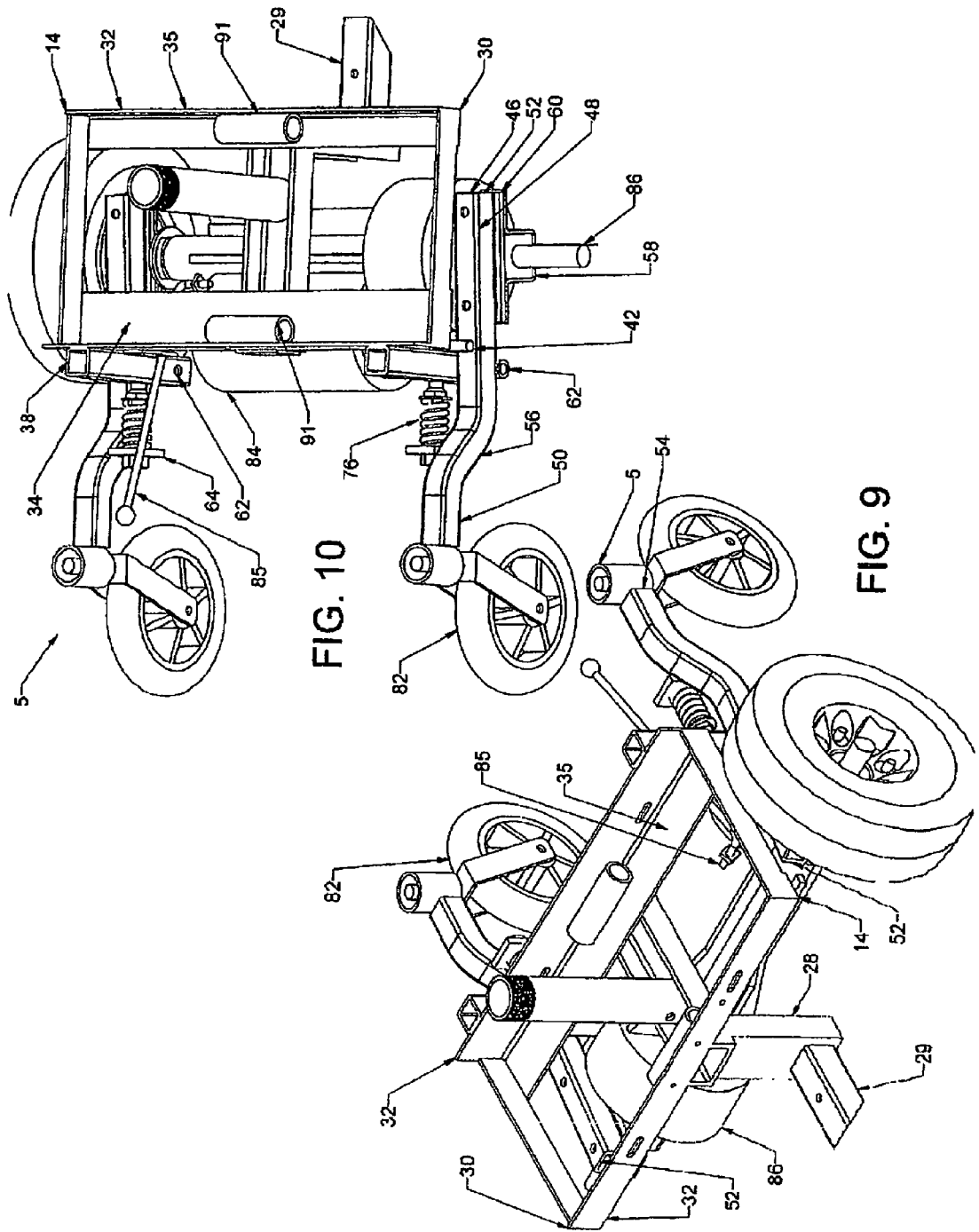

PERSONAL MOBILITY VEHICLE WITH ANTI-TIP SUSPENSION

CROSS REFERENCE TO RELATED APPLICATION

This application is a continuation of U.S. patent application Ser. No. 11/455,564 filed Jun. 19, 2006, now U.S. Pat. No. 7,562,903 the content of which is incorporated herein by reference.

BACKGROUND OF THE INVENTION

1. Field of the Invention

The present invention relates generally to personal mobility vehicles (PMVs), and in particular to a PMV with a suspension providing control and tipping resistance over a wide variety of indoor and outdoor operating conditions.

2. Description of the Related Art

PMVs, which are also referred to as scooters, are becoming increasingly popular as mobility assistance devices for individuals with limited ambulatory function. They provide a number of advantages for users, some of whom might otherwise be forced to depend on others for assistance or use wheelchairs, walkers, canes, etc., all of which have significant mobility limitations. PMVs, on the other hand, are typically self-propelled and tend to liberate their riders, who can thereby enjoy relatively wide freedom of mobility, particularly in facilities that are compliant with the Americans with Disabilities Act (ADA) and other applicable codes, rules, etc.

Although such PMVs tend to function best on flat, level surfaces, their operators commonly encounter sloping (inclined, declined and side-to-side), convex, concave and otherwise uneven surface conditions. Moreover, their riders often require both indoor and outdoor mobility. For example, PMVs are frequently used away from home for access to areas, activities and events, which otherwise might be inaccessible to individuals with reduced ambulatory function. They are often transported in van-type vehicles and are therefore subject to space limitations while in transit. A dual-purpose indoor/outdoor PMV would therefore be preferable for ease of transportation.

Indoor operations often require relatively tight turning radii and compact vehicle designs in order to traverse corridors, pass through doorways and navigate other indoor conditions. Outdoor operations, on the other hand, can involve irregular natural ground surfaces, vehicle traction concerns and various other conditions. A dual-purpose (indoor and outdoor) PMV would be preferable, provided it could handle such varied operating conditions. Another PMV design criteria relates to disassembly into major components. Partially disassembled PMVs tend to be easier to store, transport and service. For example, separating the major components facilitates lifting and handling. Compact designs are often desirable for purposes of accessibility and for providing tighter turning radii. However, larger PMVs tend to be more stable. Therefore, PMV designs typically represent compromises involving such design criteria as size, stability, performance and maneuverability.

A common problem and concern with PMVs relates to stability and resistance to tipping. PMVs with larger wheel bases tend to be more stable, but less maneuverable. A partial solution is to provide a relatively short wheelbase from a steering front wheel to the main wheels for maneuverability, and to provide anti-tip trailing wheels, which are located behind the main wheels, for stability. Such trailing wheels tend to resist backwards tipping. For example, the Lo U.S. Pat. No. 6,896,084 shows a wheeled vehicle with a detachable rear frame including anti-tip wheels. Degonda et al. (U.S. Pat. No. 5,964,473) show trailing wheels mounted on a wheelchair.

Another PMV design issue relates to weight distribution. Five-wheel PMVs have steering front wheels, main wheels (at least one of which is driven) and anti-tip trailing wheels. Ideally most of the combined weight of the vehicle and the rider is on the main wheels for traction. However, the steering front wheel must also support a portion of the total load for control purposes. The proportional weight distribution, particularly on the main wheels, justly should remain relatively constant with riders of different sizes for maintaining traction and control.

Heretofore there has not been available a PMV with an anti-tip suspension subframe with the advantages and features of the present invention.

SUMMARY OF THE INVENTION

In the practice of an aspect of the present invention, a PMV is provided including a frame with a pivotally-mounted, anti-tip suspension adapted for rotation about a transverse, pivotal axis. The frame mounts a steering front wheel, which is controlled by a tiller. The anti-tip suspension mounts a drivetrain and includes trailing arms mounting trailing wheels. A counter-rotating spring mechanism is connected to the suspension and is adapted for applying a counter-rotational force around a transverse, pivotal axis whereby the front and trailing wheels are maintained in contact with various travel surfaces, which can be flat and level, sloping in either an ascending or a descending direction, convex or concave. Relatively constant proportional weight distribution is provided throughout a range of different rider loads by placing the rider center of mass relatively close to the main wheel rotational axis. The suspension pivotal axis is slightly behind the main wheel rotational axis, and the trailing wheel rotational axis is spaced considerably further aft.

BRIEF DESCRIPTION OF THE DRAWINGS

FIG. 4 is a top plan view thereof

FIG. 5 is a left side elevational view thereof.

FIG. 6 is a rear elevational view thereof.

FIG. 7 is an upper, left side perspective view thereof.

FIG. 8 is an enlarged, fragmentary, detailed view of an anti-tip spring mechanism thereof.

FIG. 9 is an upper, front, left side perspective view of a rear subframe and an anti-tip suspension thereof.

FIG. 10 is an upper, right side perspective view thereof.

DETAILED DESCRIPTION OF THE PREFERRED EMBODIMENTS

I. Introduction and Environment

Figure 1:
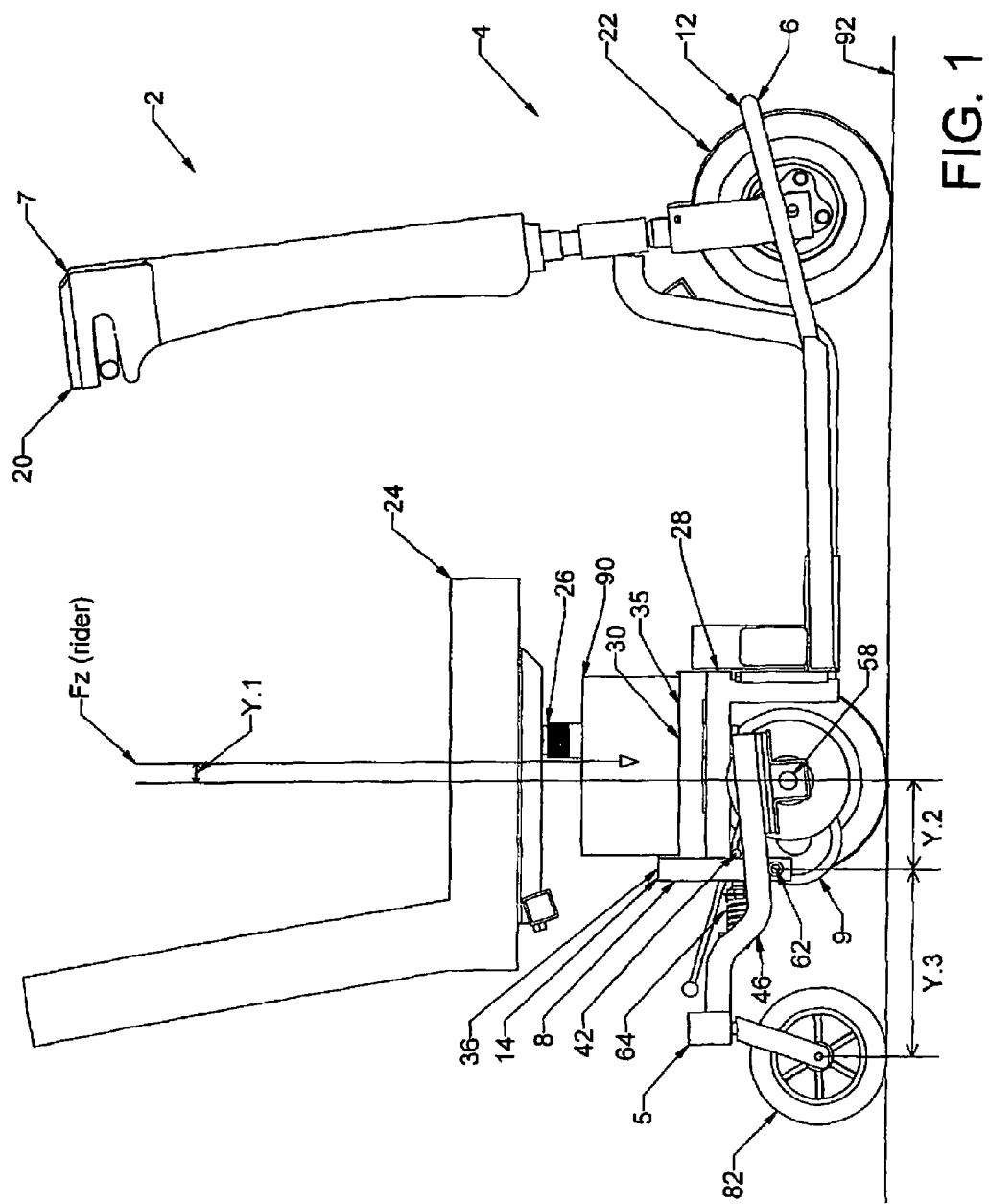
FIG. 1 is a side elevational view of a PMV embodying an aspect of the present invention, shown on a level surface.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Certain terminology will be used in the following description for convenience in reference only and will not be limiting. Said terminology will include the words specifically mentioned, derivatives thereof and words of similar meaning.

Referring to the drawings in more detail, the reference numeral 2 generally designates a personal mobility vehicle (PMV) embodying the present invention. Without limitation on the generality of useful configurations of PMVs that can be adapted for and benefit from the present invention, the PMV 2 generally includes a frame 4, an anti-tip suspension 5, a steering mechanism 7 and a drivetrain 9.

II. Frame 4

Figure 3:
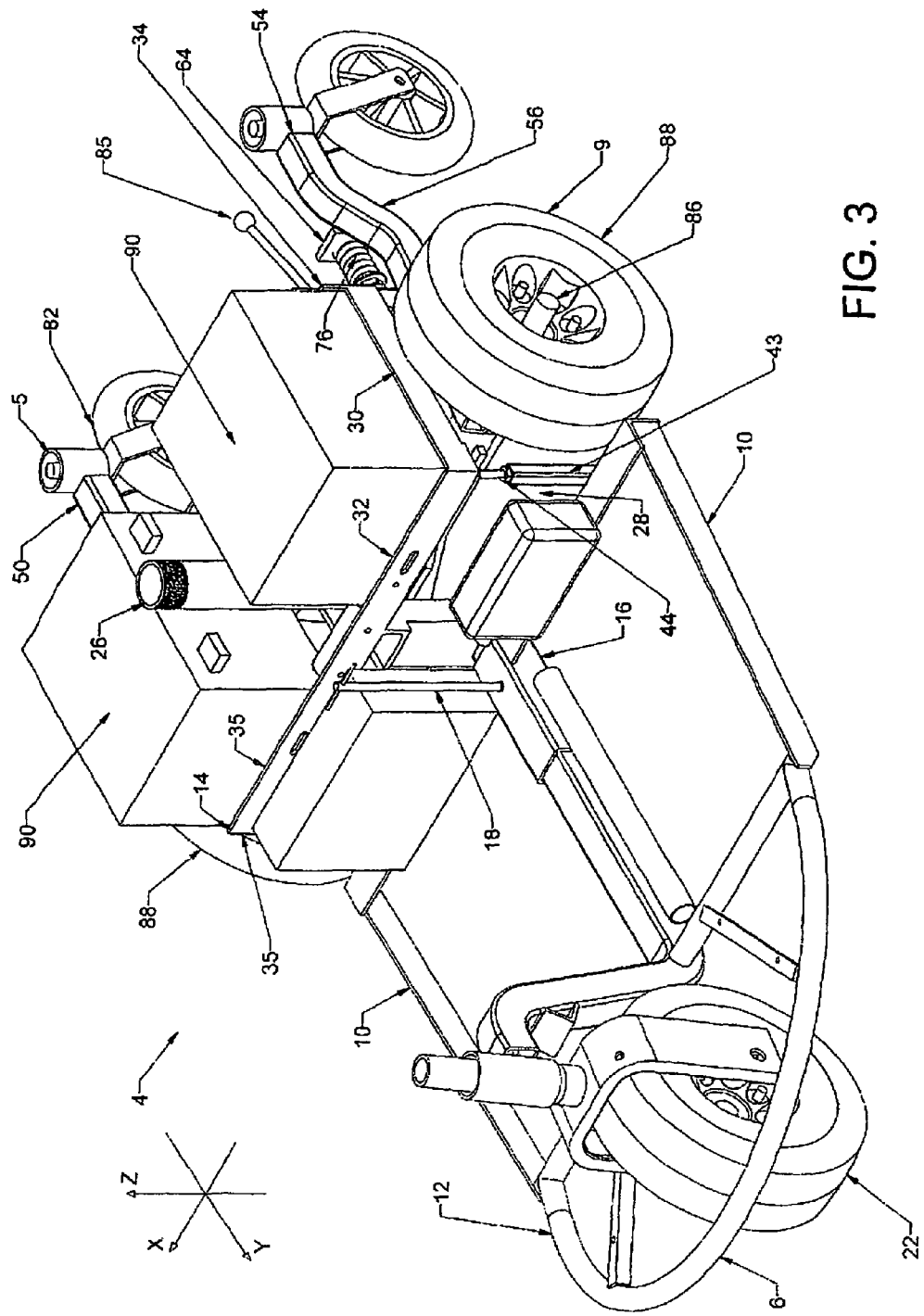
FIG. 3 is an upper, front, left side perspective view of the PMV, particularly showing a flame thereof.

The frame 4 includes front and rear frame ends 6, 8 and opposite frame sides 10. The frame 4 optionally includes front and rear subframes 12, 14, which can be releasably interconnected by a tongue-and-socket connection 16, which is locked by a removable retaining pin 18 (FIG. 3) accessible to the user. A seat 24 is mounted on a tubular column 26 extending upwardly from the rear subframe 14. The weight of the rider generally exerts a downward vertical (Z direction) gravitational force $F_Z$ through the column 26 to the frame 4.

The rear subframe 14 includes a front leg 28, which can comprise a channel section. A tongue 29 is mounted on and extends forwardly from the front leg 28 for selective insertion in a socket in the front subframe 12 to form the tongue-and-socket connection 16. The rear subframe 14 further includes a top platform 30 with front and rear transverse angle sections 32, 34 defining a battery tray 35 therebetween and a pair of suspension mounts comprising rear support legs 36 with rear support leg upper ends 38 affixed to the rear angle section 34. The rear support legs 36 depend downwardly from the rear angle section 34 and terminate at support leg lower ends 40. Stop rods 42 are attached to the support legs 36 and extend laterally outwardly therefrom. A pair of adjustable-height spacers 43 are mounted on the rear of the front subframe 12 and include height adjustment bolts 44 adapted to selectively engage the rear subframe top platform 30. The height adjustment bolts 44 are adapted for fine adjustments to level the top platform 30 relative to the front subframe 12. Such adjustments may be necessary to vertically align, plumb and level the tiller 20, the seat column 26 and other components of the PMV 2.

III. Anti-Tip Suspension 5

The anti-tip suspension 5 includes a pair of trailing arms 46. Each trailing arm 46 includes front and rear sections 48, 50 terminating at front and rear ends 52, 54 respectively. An offset intermediate section 56 extends generally upwardly and rearwardly from each trailing arm front section 48 to its respective rear section 50 whereby the trailing arm rear sections 50 are positioned generally parallel to and above the trailing arm front sections 48. The underside of each trailing arm front section 48 mounts an axle bushing 58, which can include a suitable rubber vibration-dampening spacer 60. A rear leg pivotal connection and bushing 62 is also mounted on the underside of each trailing arm front section 48 and is located rearwardly from a respective axle bushing 58. The rear leg connections/bushings 62 define a transverse (X direction, see FIG. 3) pivotal axis for the suspension 5.

A counter-rotation mechanism comprising an anti-tip resilient or spring assembly 64 (FIG. 8) is mounted on each trailing arm intermediate section 56 by a mounting plate 66, which is attached (e.g., welded) to the intermediate section 56 and extends transversely inwardly therefrom. A bolt 68 includes a head 70 positioned behind the mounting plate 66, a shaft 72 extending therethrough and a distal end 74. The bolt shaft 72 is received in a compression member 76, such as a spring, which is retained between the mounting plate 66 at one end and a washer 78 and a compression-adjusting lock nut 80 at the other end. The distal end 74 is preferably spaced a short distance (typically a fraction of an inch) from a respective rear leg 36. Such spacing defines a resilient assembly clearance C (FIG. 8), which accommodates a limited amount of suspension 5 rotation before the resilient assembly 64 engages a respective rear support leg 36. Tightening the lock nut 80 on the bolt 68 compresses the spring 76 and thereby increases the anti-tip, counter-rotating force $F_Y$ exerted by the resilient assembly 64 as a function of the applicable spring constant K. Other suitable mechanical fasteners can be used in place of the bolt 68.

A pair of anti-tip trailing wheels 82 are swivel-mounted on respective trailing arm rear ends 54. Other suitable ground-engaging components, such as rollers, skids and the like, can used in place of the trailing wheels 82.

The vertically-staggered or offset configuration of the trailing arms 46, with their rear sections 50 located above their front sections 48, accommodates larger-diameter trailing wheels 82. Such larger-diameter wheels tend to handle obstacles better than smaller-diameter wheels, because the former are generally better able to roll over larger obstacles. Such obstacle-handling capabilities can be particularly useful outdoors, where many obstacles, both natural and man-made, are commonly encountered. Without compromising the maneuverability advantage attributable to a relatively short wheelbase (i.e. distance from the front wheel 22 to main wheels 88), the anti-tip suspension 5, the large trailing wheels 82 and other features of the unique suspension 5 enable the PMV 2 to effectively negotiate a relatively wide variety of field conditions.

IV. Steering Mechanism 7

The front subframe 12 mounts the steering mechanism 7 including a tiller 20, which mounts a steering front wheel 22. The tiller 20 can be equipped with various controls for convenient access by the operator. Such controls can optionally include speed control (e.g. throttle or potentiometer), directional control (e.g., forward and reverse), lights, horn, brakes, etc. The tiller 20 can be adjustable fore-and-aft and otherwise in order to accommodate various operators.

V. Drivetrain 9

The drivetrain 9 includes a bidirectional, electric motor 84 drivingly connected to a transaxle 86, which extends through the axle bushings 58 and mounts the main wheels 88, one or both of which are preferably driven. Alternatively, the vehicle 2 could be provided with a pair of motors each driving a respective main wheel 88, a front-mounted motor driving the steering front wheel 22 or a manual propulsion system. The transaxle 86 defines a transverse (X direction) main or drive wheel rotational axis. Although an electric motor 84 is shown, one or more other suitable motors, including internal combustion, can be utilized. One or more (two are shown) batteries 90 are located in the battery tray 35 and are electrically connected to the motor 84 through suitable connections and controls. A pair of battery spacers 91 (e.g. plastic tubes) are mounted in the top platform angle sections 32, 34 and separate the batteries 90. Without limitation on the generality of useful batteries, they can comprise, for example, AGM-type gel sealed lead acid batteries, which can be laid on their sides in the battery tray 35. The PMV 2 can be equipped with suitable driving and parking brake systems. For example, a brake release 85 is shown for releasing a parking brake mechanism in the motor 84.

VI. Operation

In operation, the anti-tip suspension 5 accommodates a variety of operators of different sizes while traversing various surface and terrain conditions, which can be encountered both indoors and out. In particular, stability and anti-tip functionality are achieved by maintaining all five wheels in ground contact under operating conditions, which can include incline and decline sloping surfaces.

FIG. 1 shows the PMV 2 on a flat, level surface 92. In this condition the spring assemblies 64 are disengaged at clearances C, i.e. the bolt distal ends 74 are in spaced relation from the rear support legs 36 (FIG. 8). The suspension 5 distributes the vehicle and operator loads over all of the wheels, with the majority being placed on the main wheels 88 as a function of the proximity of the rider gravitational load $F_Z$ to the transaxle 86 rotational axis, as indicated by the dimension Y.1 (FIG. 1). Dimension Y.2 represents the longitudinal distance between the transaxle 86/main wheel 88 and suspension 5 rotational axes, and is also relatively short. Dimension Y.3 represents the distance between the suspension 5 rotational axis and the rotational axis of the trailing wheels 82, which is somewhat greater than Y.1 and Y.2.

Figure 2:
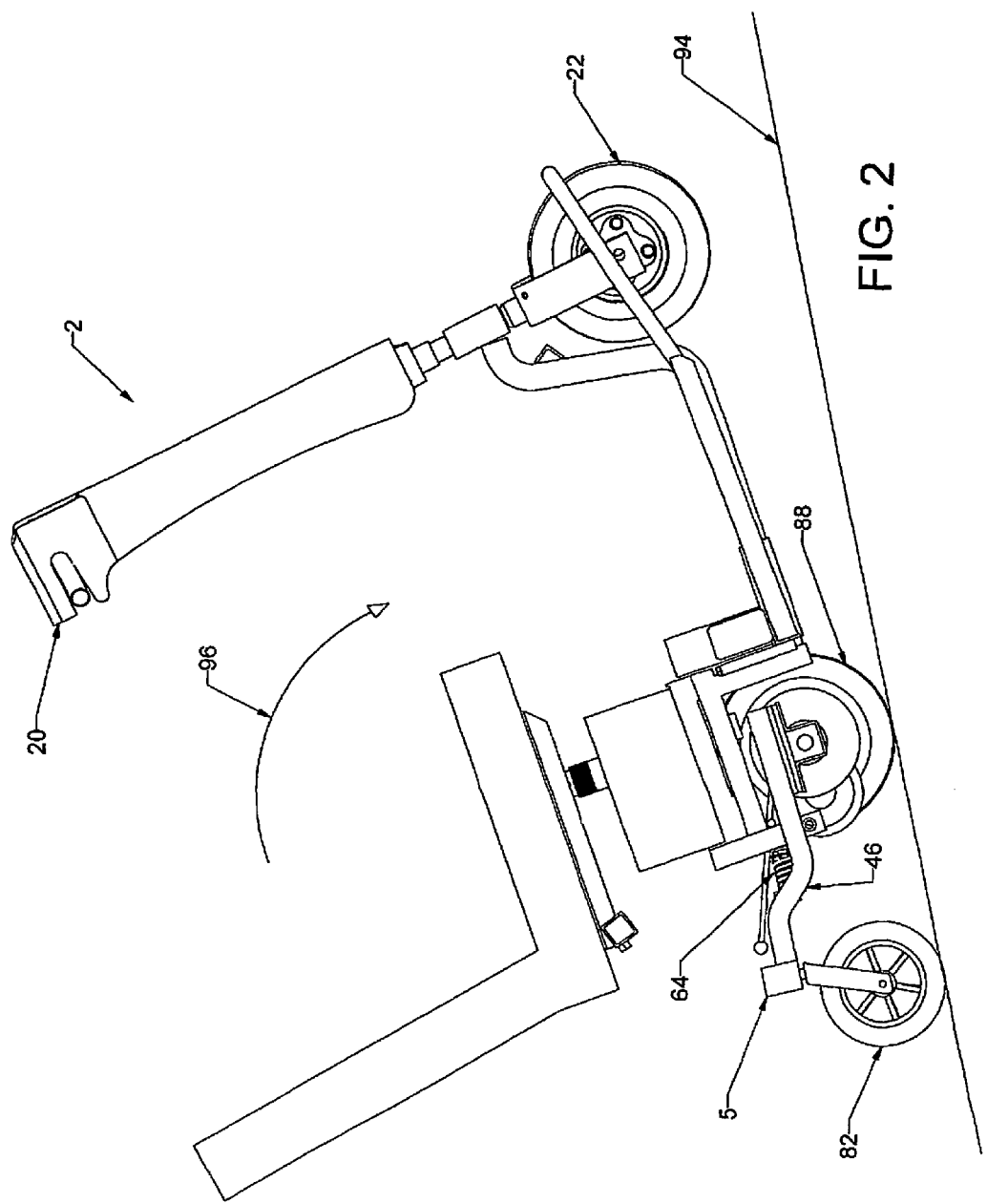
FIG. 2 is a side elevational view thereof, shown tipping backwards on an inclined, sloping surface.

The configuration described above, including the relative placements of the components and the proportions of the distances Y.1, Y.2 and Y.3, cooperate to place most of the weight of the PMV 2 and the operator on the main wheels 88 under most conditions, including on a level surface 92. Greater PMV 2 stability and main (drive) wheel 88 traction are thus provided, with the trailing wheels 82 becoming primarily involved when the PMV 2 attempts to tip over backwards (FIG. 2). Of course, the placement of the connections 62 between the support legs 36 and the trailing arms 46 can be adjusted to achieve the proper weight distribution. However, it will be appreciated that the predetermined geometry of the suspension 5, as shown, will accommodate most operating conditions with the primary adjustments occurring in the spring assemblies 64. The predetermined clearances C between the bolt distal ends 74 and the rear support legs 36 can accommodate a limited amount of relative movement between the rear subframe 14 and the anti-tip suspension 5. Minor surface undulations and irregularities are thus accommodated without involvement of the spring assemblies 64.

When the PMV ascends an inclined surface 94 (FIG. 2), the spring assemblies 64 function to maintain the steering front wheel 22 in contact with the surface 94. In particular, the geometry of the suspension 5 enhances stability and safety by exerting an anti-tip, counter-rotating force, as indicated by the arrow 96. More specifically, the rotational axes of the transaxle 86 and the leg-to-suspension pivotal connections 62 are both located below the trailing arm front sections 48. The spring 76, on the other hand, operates along a longitudinal axis ($F_Y$ in FIG. 8) extending fore-and-aft above the trailing arm front section 48. The spring 76 thus operates across a lever arm defined by this geometry. The spring assemblies 64 apply a counter-rotational force (arrow 96 in FIG. 2) to the frame 4, which tends tend to push the steering front wheel 22 back down upon encountering a backwards, tip-over condition. The adjustability of the compression springs 76 enables the PMV 2 to be suitably adjusted for various loads and surfaces in order to prevent such a backward tip-over accident. Heavier loads and steeper inclines would generally require greater compression on the springs 76 and vice versa.

Figure 11:
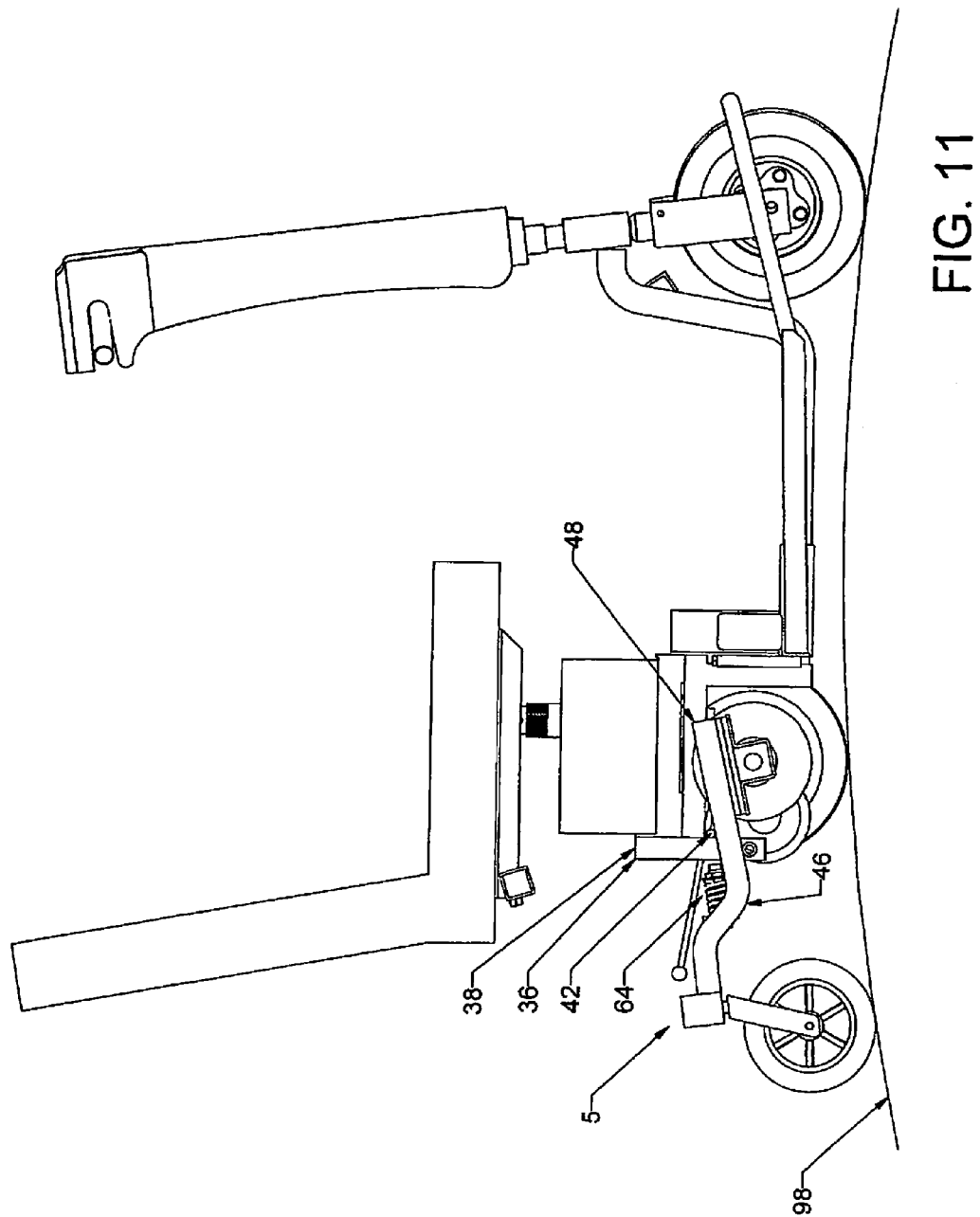
FIG. 11 is a right side elevational view of the PMV on a convex surface.
Figure 12:
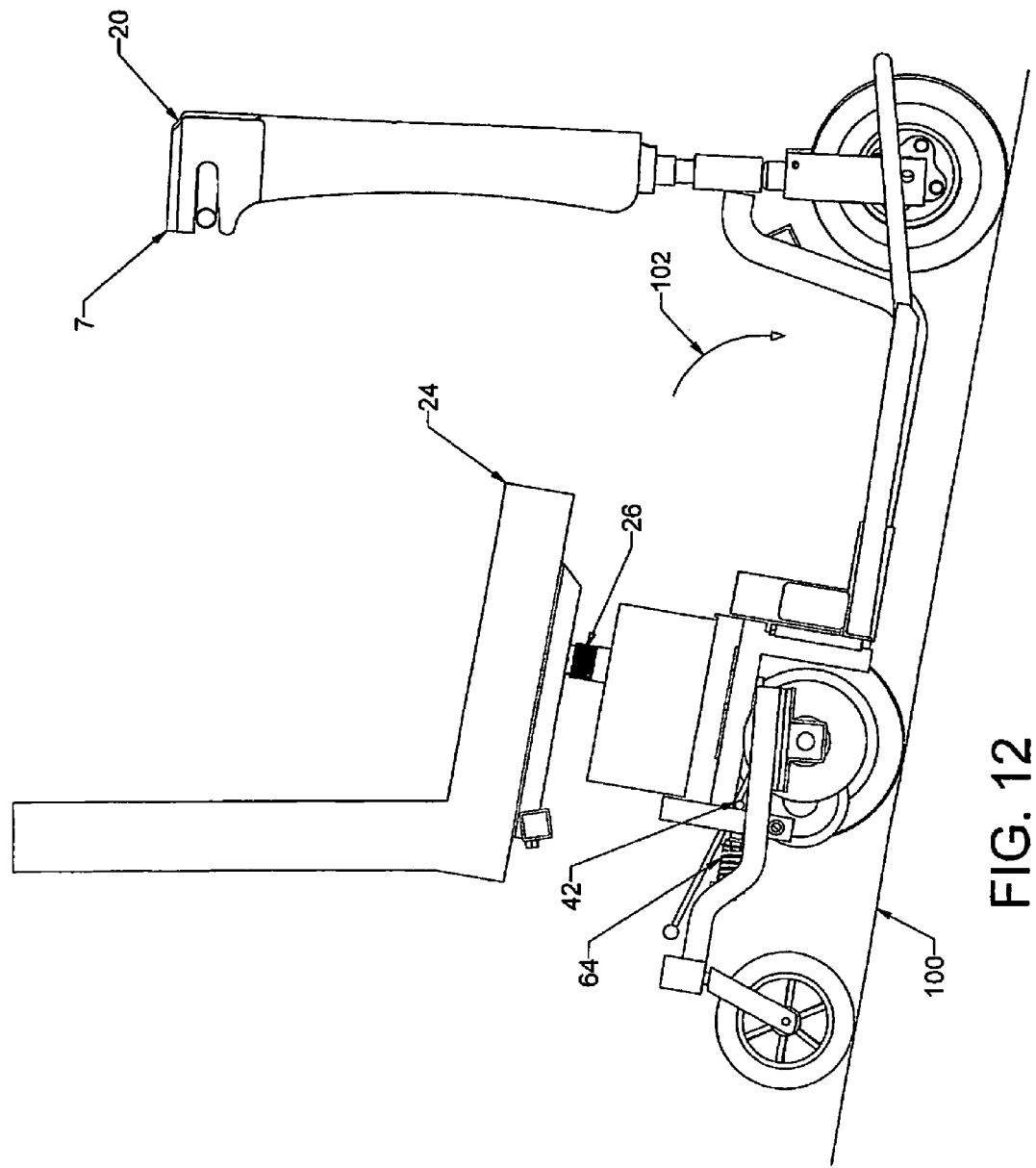
FIG. 12 is a right side elevational view of the PMV on a declined sloping surface.

A convex surface 98 condition is shown in FIG. 11 whereby the spring distal ends 74 disengage from the support legs 36 and the stop rods 42 engage the trailing arm front sections 48. The stop rods 42 thus function to restrict downward rotation of the suspension 5 (counterclockwise as shown in FIG. 11). A decline sloping surface 100 is shown in FIG. 12 with the suspension 5 positioned substantially as it would be for a level condition (FIG. 1). The mounting of the suspension 5 on the rear subframe 14 with the rotational axes for the suspension 5 and the transaxle 86 below the trailing arm front sections 48 (i.e. the lowest parts of the trailing arms 46) enhances stability, particularly when the brakes are applied. It will be appreciated that brake application on a decline (FIG. 12) generates a clockwise rotational force as indicated by the force arrow 102, which could pitch the PMV 2 and operator forward under severe conditions. The relatively low placement of the suspension 5 rotational axis resists such a pitch-forward rotational force because the applicable lever arm (defined by the distance between the suspension 5 rotational axis at 62 and the ground surface 100) is relatively small.

Figure 13:
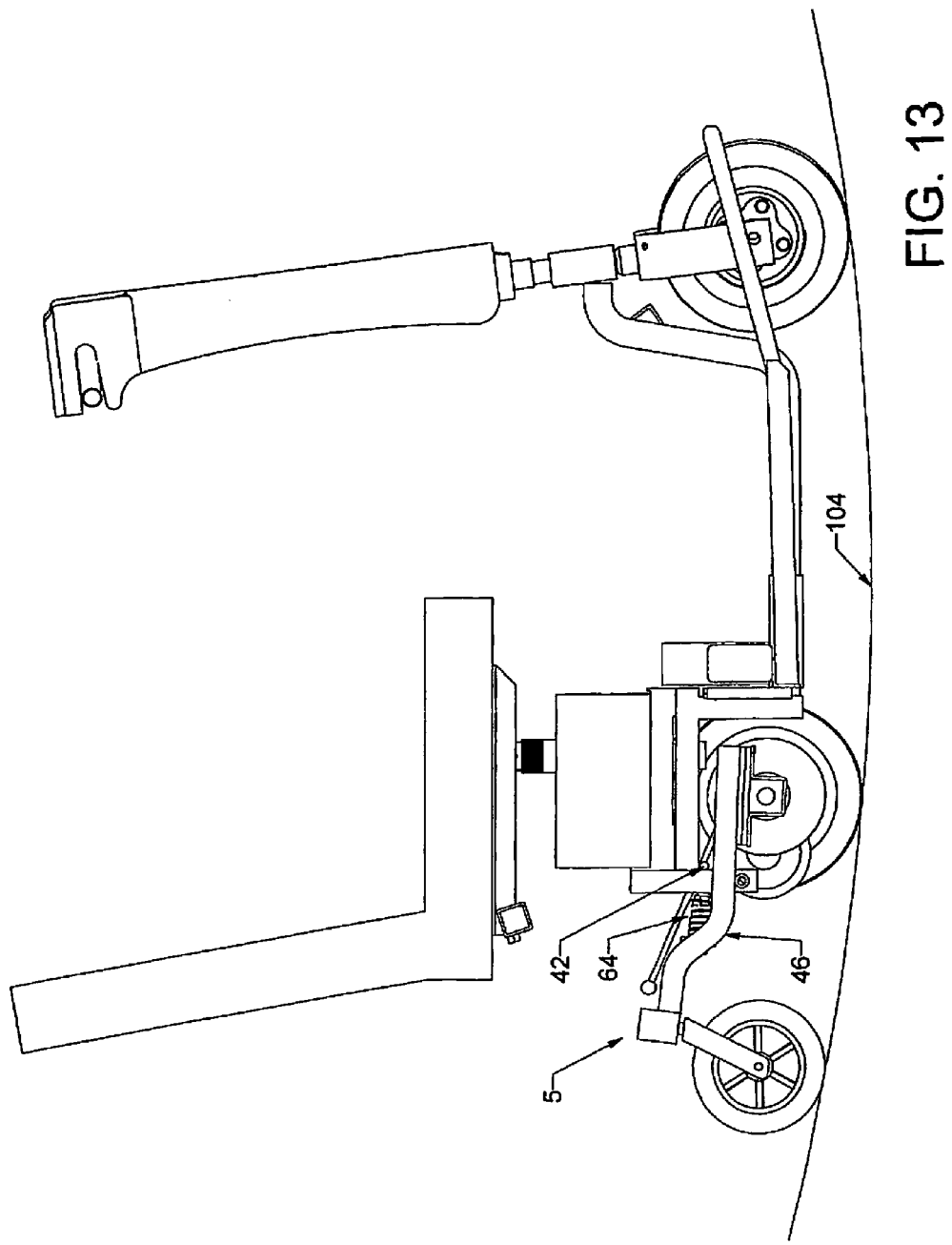
FIG. 13 is a right side elevational view of the PMV on a concave surface.

FIG. 13 shows a concave travel surface 104 and the suspension 5 rotated slightly clockwise (as shown FIG. 13) relative to the frame 4. Relatively shallow concave conditions are accommodated without compressing the spring assemblies 64 because the resilient assembly/rear support leg clearances C accommodate smaller, incremental rotations.

The geometry of the PMV 2 tends to maintain a relatively constant proportional weight distribution of the PMV 2 throughout a range of conditions from empty (no rider or cargo) through loads of 200 pounds and more. In particular, the relative placements of the rider center of mass (acting along gravitational force arrow $F_Z$), the main wheel rotational axis at 58, the suspension pivotal axis at 62 and the trailing wheel 82 rotational axis cooperate to maintain relatively constant proportional weight distribution on the main wheels 88. It will be appreciated that the load can comprise one or more riders and various objects, which can be placed on the PMV 2 or the rider(s). The weight distribution for empty and 200 pound load conditions is shown in the following table:

TABLE 1

| | Proportional Weight Distribution | | |
|---|---|---|---|
| | Steering Front Wheel | Main Wheels | Trailing Wheels |
| No Load | 22.5% | 55.0% | 22.5% |
| 200 Pound Load | 20.6% | 56.4% | 23.1% |

VII. Modified Aspect or Embodiment PMV 122

Figure 14:
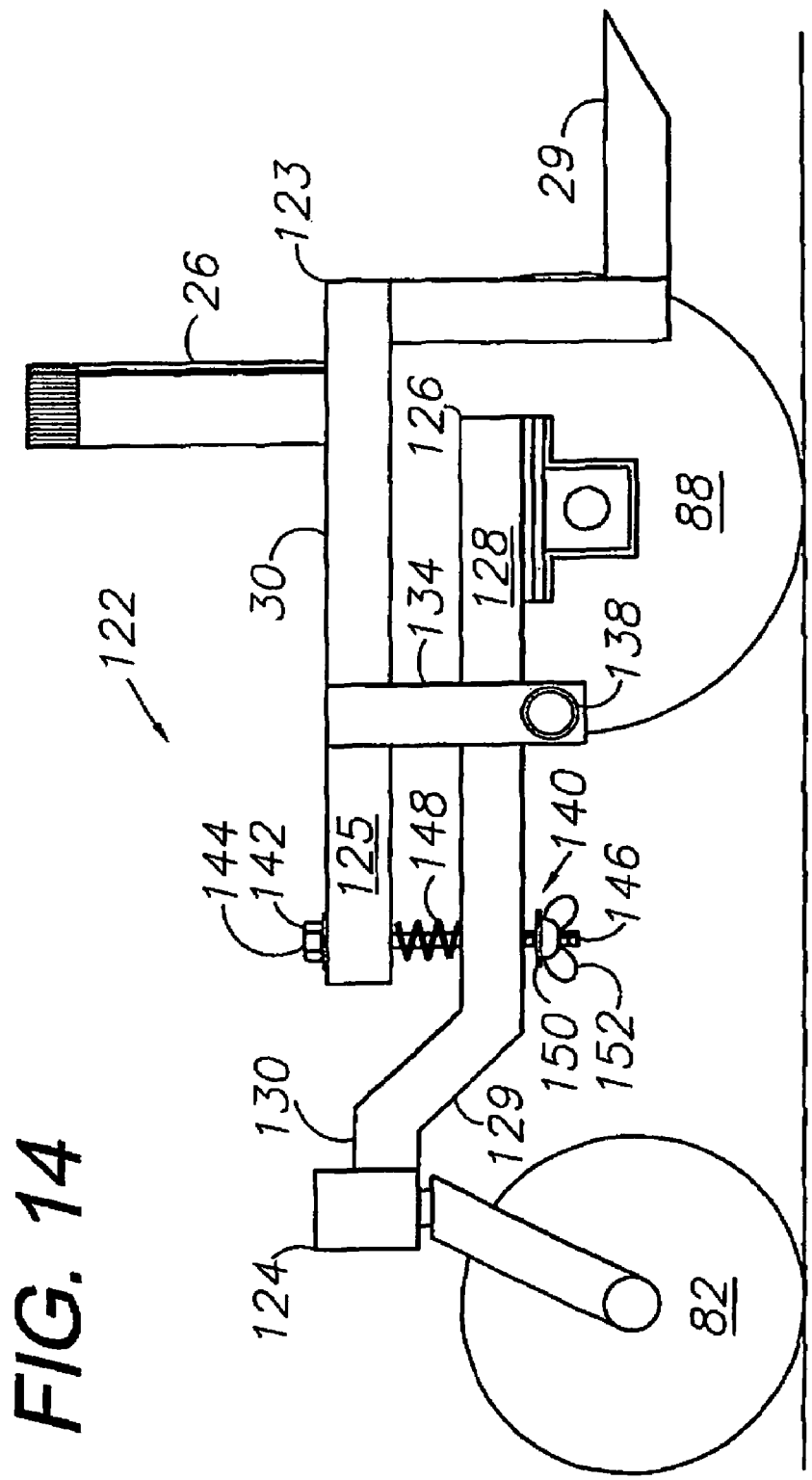
FIG. 14 is a fragmentary, right side elevational view of a PMV embodying another aspect of the invention with a modified rear subframe and a modified anti-tip suspension, shown on a level surface.
Figure 15:
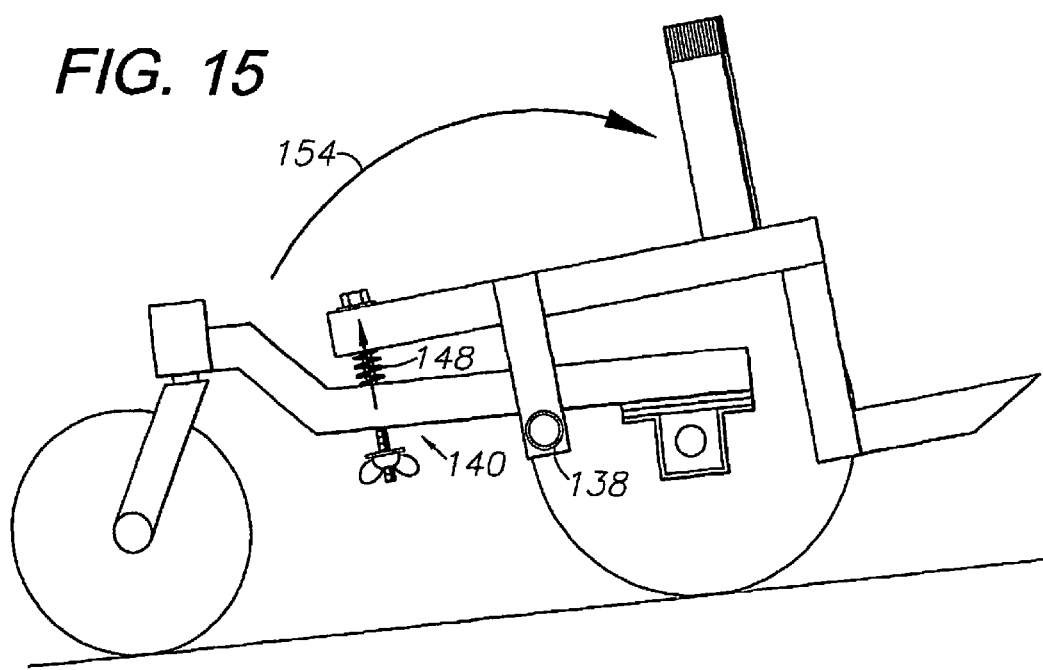
FIG. 15 is a fragmentary, right side elevational view thereof, showing the rear subframe tipping backwards and resisted by the anti-tip suspension.
Figure 16:
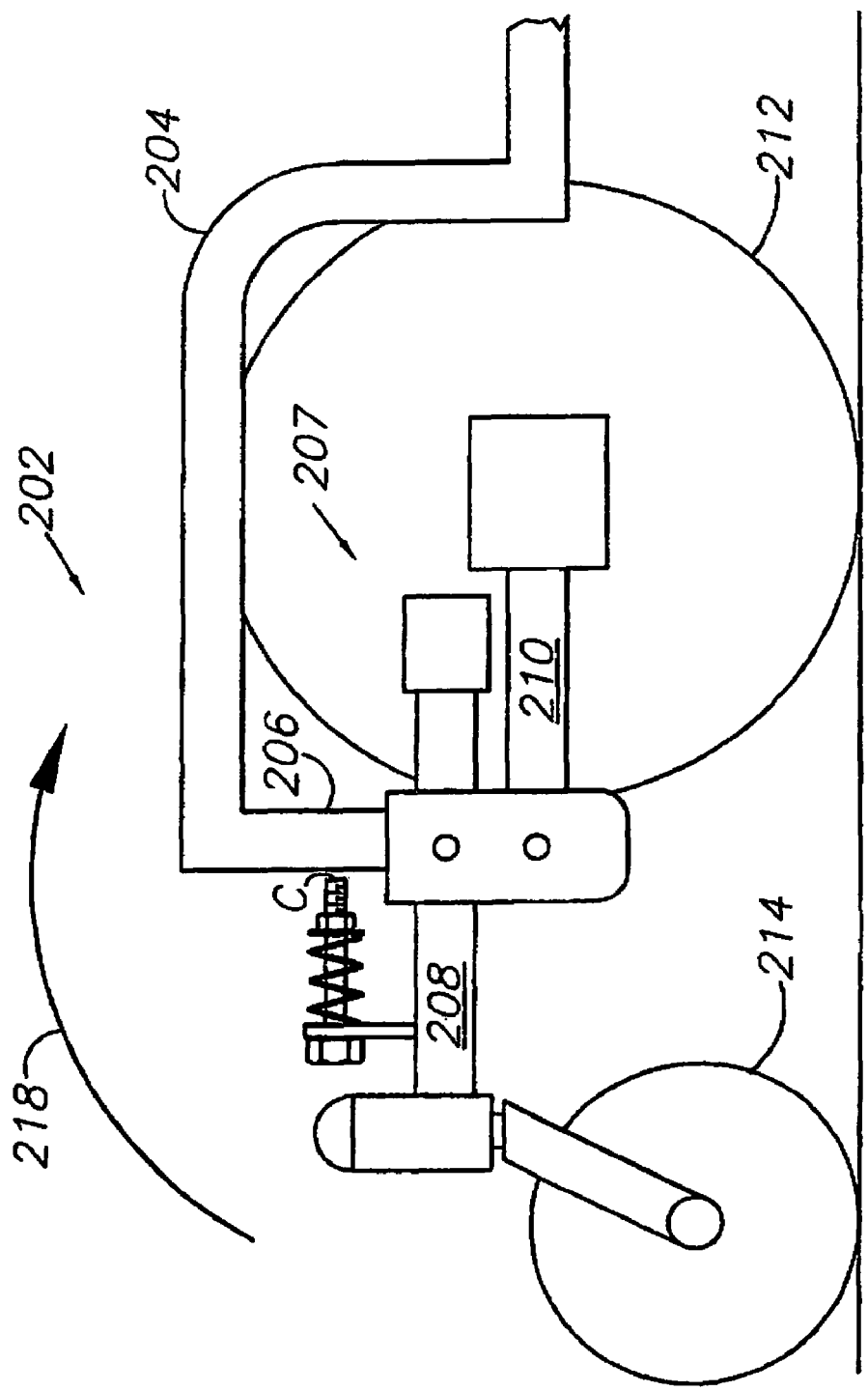
FIG. 16 is a fragmentary, right side elevational view of a PMV embodying another aspect of the invention.

A PMV 122 comprising a first modified aspect or embodiment of the invention is shown in FIGS. 14 and 15 and includes a modified rear subframe 123 and a modified anti-tip suspension 124. The rear subframe 123 includes a pair of extension arms 125. The suspension 124 includes a pair of trailing arms 126 each having front, intermediate and rear sections 128, 129 and 130. The trailing arm front sections 128 are pivotally connected to rear support legs 134 of the rear subframe 123 at pivotal connections 138, which define a subframe rotational axis.

A pair of counter-rotational spring assemblies 140 each includes a bolt 142 with a head 144 and a threaded shank 146. The shank 146 extends through vertically aligned receivers in a respective rear subframe extension arm 125 and a respective trailing arm front subframe 128. A compression spring 148 receives the shank 146 and is compressible between the extension arm 135 and the trailing arm front subframe 128. The shank 146 threadably mounts a self-locking wing nut 152 below the trailing arm front subframe 128 whereby the range of rotation is adjustable, as described above. The bolt 142 and the nut 152 adjustably limit rotation of the suspension subframe 124 in a counterclockwise direction (as shown in FIG. 14).

The modified aspect PMV 122 otherwise functions substantially similarly to the PMV 2 described above. As shown in FIG. 15, any tendency to tip rearwardly while ascending a positive incline 94 is effectively resisted by the compression springs 148, which are compressed between the extension arms 125 and the trailing arm front sections 128. The springs 148 exert an anti-tip, counter-rotational force, as indicated by arrow 154 (FIG. 15). Other components of the PMV 122 can be substantially similar to the PMV 2 described above, such as the front subframe, the drivetrain, etc. Force adjustability via the spring assemblies 140 can be achieved by changing the springs 148. For example, pairs of springs 148 can be provided to accommodate various sizes of riders and different operating conditions. Heavier riders and steeper inclines would generally require stiffer springs with greater spring constants K, and vice versa. Spring compression can also be adjusted by providing suitable adjusting nuts and lock nuts on the bolts 142 whereby the anti-tipping force applied in the direction of the force arrow 154 can be adjusted as needed.

It is to be understood that the invention can be embodied in various forms, and is not to be limited to the examples discussed above. Other components and configurations can be utilized in the practice of the present invention.

Having thus described the invention, what is claimed as new and desired to be secured by Letters Patent is:

1. A personal mobility vehicle, which includes:
   a frame including front and rear ends and opposite sides;
   a steering mechanism including at least one steering front wheel mounted on said frame in proximity to said front end;
   said frame including a suspension mount located in proximity to said rear end;
   a suspension pivotally mounted on said suspension mount and including a ground-engaging component located behind said frame rear end;
   a transverse suspension pivotal axis extending through said pivotal connection between said suspension mount and said suspension;
   a counter-rotation mechanism mounted on said frame or said suspension and adapted for resisting pivotal rotation therebetween by exerting an anti-tipping torque force around said suspension pivotal axis;
   a drivetrain including a pair of main wheels mounted on said suspension and rotatable about a transverse main wheel rotational axis located in front of said suspension pivotal axis;
   said suspension directly connecting said ground-engaging component and said drivetrain;
   said drivetrain further including a motor drivingly connected to at least one of said wheels;
   said suspension including at least one trailing arm with a front section pivotally connected to said suspension mount and a rear section mounting said ground-engaging component; and
   said counter-rotation mechanism including at least one resilient assembly mounted on one of said frame and said trailing arm and including a compression member compressed by a rotational force around said suspension pivotal axis.

2. The personal mobility vehicle according to claim 1, which includes:
   said suspension mount comprising a pair of support legs located at said frame rear end;
   said suspension including a pair of said trailing arms each pivotally connected to a respective support leg; and
   a pair of said ground-engaging components each mounted on a respective trailing arm and comprising a trailing wheel.

3. The personal mobility vehicle according to claim 2 wherein each said resilient assembly includes:
   an adjustment for adjustably compressing said compression member.

4. The personal mobility vehicle according to claim 3 wherein each said resilient assembly comprises a spring assembly and includes:
   a mounting plate mounted on a respective trailing arm and extending laterally therefrom;
   a bolt with a head, a shaft and a distal end, said bolt extending through said mounting plate towards a respective support leg;
   said compression member comprising a compression spring receiving said bolt shaft; and
   said adjustment comprising an adjustment nut threadably received on said shaft adjacent to said distal end and adapted for adjustably compressing said spring against said mounting plate.

5. The personal mobility vehicle according to claim 2, which includes:
   a drive assembly connected to said motor and at least one of said main wheels;
   a pair of axle bushings each mounted on the underside of a respective trailing arm front section in front of a respective suspension connection;
   each said suspension connection including a support leg bushing mounted on the underside of a respective trailing arm; and
   said suspension pivotal axis and said main wheel rotational axis being located below said trailing arm front sections.

6. The personal mobility vehicle according to claim 5, which includes:
   each said trailing arm having an intermediate section extending between said front and rear sections;
   each said trailing arm rear section being located above and behind a respective front section; and
   said ground-engaging components comprising a pair of trailing wheels each mounted on a respective trailing arm rear section.

7. The personal mobility vehicle according to claim 1, which includes:

said frame including front and rear subframes; and
a seat mounted on said rear subframe.

8. The personal mobility vehicle according to claim 7, which includes:
   a tongue-and-socket connection detachably connecting said subframes.

9. The personal mobility vehicle according to claim 7, which includes:
   said rear subframe including a top platform having a battery tray; and
   said drivetrain including at least one battery mounted in said battery tray and connected to said motor.

10. A personal mobility vehicle, which includes:
    a frame including front and rear ends and opposite sides;
    a steering mechanism including at least one steering front wheel mounted on said frame in proximity to said front end;
    said frame including a suspension mount located in proximity to said rear end;
    a suspension pivotally mounted on said suspension mount and including a ground-engaging component located behind said frame rear end;
    a transverse suspension pivotal axis extending through said pivotal connection between said suspension mount and the suspension;
    a counter-rotation mechanism mounted on one of said frame and said suspension and adapted for resisting pivotal rotation therebetween by exerting an anti-tipping torque force around said suspension pivotal axis;
    a pair of main wheels mounted on said suspension and rotatable about a transverse main wheel rotational axis located in front of said suspension pivotal axis;
    a seat mounted on said frame and generally locating a rider center of mass; and
    said seat, suspension pivotal axis, main wheel rotational axis and trailing wheel being located relative to each other whereby a predetermined proportional weight distribution on said main wheels remains approximately constant or greater with greater rider loads.

11. The personal mobility vehicle according to claim 10, which includes:
    said proportional weight distribution comprising approximately 15-25% on said steering front wheel, 50-60% on said main wheels and 15-30% on said trailing wheels.

12. The personal mobility vehicle according to claim 10, which includes:
    said rider center of mass being located in close proximity longitudinally to said suspension rotational axis;
    said suspension pivotal axis being located longitudinally intermediate said main wheel rotational axis and said ground-engaging component; and
    said suspension pivotal axis being located substantially closer longitudinally to said main wheel rotational axis than said ground-engaging component.

13. The personal mobility vehicle according to claim 12, which includes:
    said suspension including a trailing arm mounting said ground-engaging component; and
    said suspension pivotal axis being located below said trailing arm and slightly above the level of said main wheel rotational axis with said vehicle level.

14. A personal mobility vehicle, which includes:
    a frame including front and rear ends and opposite sides;
    said frame further including front and rear subframes;
    said rear subframe including a pair of rear support legs located at said frame rear end and each having upper and lower ends;
    a steering mechanism including at least one steering front wheel mounted on said front subframe in proximity to said front end and a tiller connected to and extending upwardly from said steering front wheel;
    a suspension including a pair of trailing arms each having a front section, a rear section and an intermediate section extending between said front and rear sections;
    a pair of support leg/suspension connections each pivotally connecting a respective support leg lower end with a respective trailing arm front section;
    a pair of counter-rotation spring assemblies each including: a mounting plate connected to a respective trailing arm and extending laterally therefrom in spaced relation behind said suspension pivotal connection; a bolt with a head, a shaft and a distal end, said bolt extending through said mounting plate towards a respective support leg; a compression spring receiving said bolt shaft; an adjustment nut threadably received on said shaft adjacent to said distal end and adapted for adjustably compressing said spring against said mounting plate; and a clearance space between said bolt distal end and said support leg whereby said suspension has a limited range of free rotation without compressing said spring; and
    a drivetrain including: a transaxle mounted on said suspension and extending transversely along an axle rotational axis; a pair of main wheels each mounted on said transaxle adjacent to a respective trailing arm; a motor connected to said transaxle; and a battery connected to said motor.

15. The personal mobility vehicle according to claim 14, which includes:
    each said resilient assembly bolt distal end forming said clearance space from a respective support leg with said personal mobility vehicle on a relatively flat surface; and
    said clearance spaces accommodating a limited range of suspension rotation relative to said frame rear section without compressing said springs.

16. The personal mobility vehicle according to claim 14, which includes:
    a pair of axle bushings each mounted on the underside of a respective trailing arm front section; and
    a pair of support leg bushings each mounted on the underside of a respective trailing arm front section behind said axle rotational axis.

17. The personal mobility vehicle according to claim 16, which includes:
    a pair of elastomeric, compressible spacers each mounted between a respective axle bushing and a respective trailing arm.

18. The personal mobility vehicle according to claim 14, which includes:
    said rear subframe including a top platform with a battery tray receiving said battery;
    said rear support legs having upper ends mounted on said top platform and depending downwardly therefrom;
    a seat column mounted on said top platform and extending upwardly therefrom, said seat column being located in front of said suspension rotational axis; and
    a seat mounted on said seat column.

19. The personal mobility vehicle according to claim 14, which includes:
    a detachable tongue-and-socket connection including a socket on one of said front and rear subframes and a tongue on the other of said subframes, said tongue being removably received in said socket whereby said subframes are detachably interconnected.

20. The personal mobility vehicle according to claim 19, which includes:
a pair of adjustable-height spacers mounted on said front subframe in proximity to said frame opposite sides; and
each said spacer including a height adjustment bolt extending upwardly therefrom and adapted for engaging said rear subframe for adjustably positioning said subframes relative to each other.

* * * * *